United States Patent
Fabian et al.

(10) Patent No.: US 12,528,334 B2
(45) Date of Patent: Jan. 20, 2026

(54) COOLING SYSTEM FOR A MOTOR VEHICLE, AND MOTOR VEHICLE

(71) Applicant: Bayerische Motoren Werke Aktiengesellschaft, Munich (DE)

(72) Inventors: Karsten Fabian, Oberschleissheim (DE); Bernd Jacob, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 18/562,904

(22) PCT Filed: Jul. 6, 2022

(86) PCT No.: PCT/EP2022/068738
§ 371 (c)(1),
(2) Date: Nov. 21, 2023

(87) PCT Pub. No.: WO2023/011830
PCT Pub. Date: Feb. 9, 2023

(65) Prior Publication Data
US 2024/0246393 A1    Jul. 25, 2024

(30) Foreign Application Priority Data
Aug. 5, 2021 (DE) .................... 10 2021 120 350.3

(51) Int. Cl.
*B60H 1/00* (2006.01)
*B60H 1/32* (2006.01)

(52) U.S. Cl.
CPC ..... *B60H 1/00885* (2013.01); *B60H 1/00278* (2013.01); *B60H 1/00571* (2013.01); *B60H 1/32284* (2019.05)

(58) Field of Classification Search
CPC ............ B60H 1/00278; B60H 1/00571; B60H 1/00885; B60H 1/32284
See application file for complete search history.

(56) References Cited

U.S. PATENT DOCUMENTS 5,794,575 A * 8/1998 Sonnemann ............ F28F 27/02
                                                        237/12.3 B
9,533,546 B2 * 1/2017 Cheng ................. H01M 10/625
(Continued)

FOREIGN PATENT DOCUMENTS

DE    11 2014 001 830 T5    12/2015
DE    11 2015 002 902 T5     3/2017
(Continued)

OTHER PUBLICATIONS

International Search Report (PCT/ISA/210) issued in PCT Application No. PCT/EP2022/068738 dated Oct. 7, 2022 with English translation (4 pages).
(Continued)

*Primary Examiner* — Jonathan Bradford
(74) *Attorney, Agent, or Firm* — Crowell & Moring LLP

(57) ABSTRACT

A cooling system for a motor vehicle includes a first cooling circuit through which a coolant can flow, and at least one drive machine by way of which the motor vehicle can be driven, disposed in the first cooling circuit and thus is cooled by way of the coolant. A first cooler for cooling the coolant flowing through the first cooling circuit is disposed in the first cooling circuit. The system further includes a second cooling circuit through which the coolant can flow, and a flow branch, through which the coolant can flow and in which a second cooler is disposed for cooling the coolant flowing through the flow branch. A valve device can be switched between a first switching state and a second switching state to thereby connect the second cooler selectively, and thus as required, to the first cooling circuit or to the second cooling circuit.

15 Claims, 4 Drawing Sheets

(56) References Cited

U.S. PATENT DOCUMENTS

| | | |
|---|---|---|
| 2016/0031291 A1 | 2/2016 | Enomoto et al. |
| 2017/0197490 A1 | 7/2017 | Enomoto et al. |
| 2020/0276882 A1 | 9/2020 | Allgaeuer et al. |
| 2020/0298657 A1 | 9/2020 | Allgaeuer et al. |
| 2020/0338956 A1 | 10/2020 | Oh et al. |

FOREIGN PATENT DOCUMENTS

| | | |
|---|---|---|
| DE | 10 2017 004 588 A1 | 11/2017 |
| DE | 10 2017 220 376 A1 | 5/2019 |
| DE | 10 2019 008 255 A1 | 6/2020 |
| DE | 10 2019 132 688 A1 | 6/2020 |
| DE | 10 2019 107 194 A1 | 9/2020 |
| DE | 10 2019 132 494 A1 | 10/2020 |
| DE | 10 2019 205 414 A1 | 10/2020 |
| JP | 2014-201224 A | 10/2014 |
| JP | 2016-3828 A | 1/2016 |

OTHER PUBLICATIONS

German-language Written Opinion (PCT/ISA/237) issued in PCT Application No. PCT/EP2022/068738 dated Oct. 7, 2022 with English translation (9 pages).

German-language Search Report issued in German Application No. 10 2021 120 350.3 dated Mar. 11, 2022 with partial English translation (12 pages).

\* cited by examiner

COOLING SYSTEM FOR A MOTOR VEHICLE, AND MOTOR VEHICLE

BACKGROUND AND SUMMARY

This disclosure relates to a cooling system for a motor vehicle, in particular for an automobile. Furthermore, the disclosure relates to a motor vehicle, in particular to an automobile, having such a cooling system.

DE 11 2015 002 902 T5 discloses a refrigerant circuit apparatus, having a pump on a side with a low temperature. JP 2014 201224 A has disclosed a heat management system for a vehicle. Furthermore, DE 10 2019 132 688 A1 also discloses a heat management system for a motor vehicle. DE 10 2017 220 376 A1 also discloses a cooling system for a motor vehicle, having an electrical energy store for driving the motor vehicle.

It is the object of the present disclosure to provide a cooling system for a motor vehicle and a motor vehicle having such a cooling system, such that a particularly advantageous cooling can be implemented in a manner which is particularly favorable in terms of costs, weight, and installation space.

A first aspect of the disclosure relates to a cooling system, which is also in the form of or referred to as a cooling device, for a motor vehicle, in particular for an automobile which is preferably in the form of a passenger car. This means that, in its completely produced state the motor vehicle, which is preferably in the form of an automobile, in particular in the form of a passenger car, comprises the cooling system, which is an apparatus, in particular of the motor vehicle. The cooling system comprises a first cooling circuit through which a coolant can flow. Furthermore, the cooling system comprises at least one drive machine which is arranged in the first cooling circuit and which can be used to drive the motor vehicle. Due to the fact that the drive machine is arranged in the first cooling circuit, the drive machine is to be cooled by way of the preferably liquid coolant flowing through the first cooling circuit. Preferably, the coolant comprises at least, in particular at least predominantly, water, and therefore the coolant is for example also referred to as water or cooling water. The drive machine is for example an internal combustion engine, which is also referred to as combustion engine, which can be used to drive the motor vehicle by combustion engine. It is thus for example possible for the motor vehicle to be a motor vehicle which is driven in a conventional manner and thus purely by combustion engine, that is to say a motor vehicle driven by way of the combustion engine, or the motor vehicle is for example a hybrid vehicle, which can for example be driven by way of the combustion engine and also by way of at least one electric machine. The drive machine may also be an electric machine, in particular the aforementioned electric machine, which can be used to drive the motor vehicle electrically, in particular purely electrically. It is thus for example possible for the motor vehicle to be in the form of an electric vehicle, in particular in the form of a battery electric vehicle (BEV). Preferably, the electric machine is a high-voltage component, the electrical voltage, in particular electrical operating and rated voltage, of which is preferably greater than 50 V, in particular greater than 60 V, and is very preferably several hundred volts (V). This makes it possible to realize particularly great electrical powers for the electrical, in particular purely electrical, driving of the motor vehicle. A first radiator for cooling the coolant flowing through the first cooling circuit is arranged in the first cooling circuit.

The cooling system also comprises a second cooling circuit through which the coolant can flow. The cooling system also comprises a flow branch through which the coolant can flow. A second radiator, which is provided in addition to the first radiator, is arranged in the flow branch for the purpose of cooling the coolant flowing through the flow branch. Preferably, the radiators are components which are configured separately from one another and in particular arranged separately or spaced apart from one another. In particular, the first radiator is arranged outside of the second radiator and the second radiator is arranged outside of the first radiator.

The first cooling circuit is preferably a high-temperature circuit (HT circuit). Furthermore, the second cooling circuit is preferably a low-temperature circuit (LT circuit). This should in particular be understood to mean that the coolant flows through the first cooling circuit with a first temperature and through the second cooling circuit with a second temperature lower than the first temperature. By way of example, the second temperature is exactly or at least 10 degrees, in particular at least or exactly 20 degrees, lower than the first temperature. In other words, the drive machine is for example cooled by way of a first temperature level of the coolant, in particular by way of the first temperature of the coolant, wherein a heat source which is arranged in the second cooling circuit and is to be cooled by way of the coolant flowing through the second cooling circuit as a result, and which is in particular provided in addition to the drive machine is for example cooled by way of a second temperature level of the coolant, in particular by way of the second temperature of the coolant, the second temperature level being lower than the first temperature level. Again, in other words, during operation of the cooling system, the coolant has at most the first temperature or the first temperature level in the first cooling circuit and at most the second temperature or the second temperature level in the second cooling circuit.

In order to then be able to implement a particularly advantageous cooling or cooling performance in a manner which is particularly favorable in terms of costs, weight, and installation space, provision is made according to the disclosure for the cooling system to comprise a valve device, which can be switched between at least a first switching state and at least a second switching state. By way of example, the valve device can be moved, in particular can be moved in a rotational and/or translational manner, between at least a first switching position, which brings about or sets the first switching state, and at least a second switching position, which brings about the second switching state. In other words, the valve device for example comprises a valve element which can be moved, in particular in a translational and/or rotational manner, in particular relative to a valve housing of the valve device, between the switching positions. In this case, the valve element is at least partially arranged in the valve housing.

In the first switching state, the first cooling circuit is fluidically connected to the flow branch via the valve device, as a result of which at least a portion of the coolant flowing through the first cooling circuit can be guided through the second radiator and is to be cooled by way of the second radiator. In other words, the coolant flows through the first cooling circuit when the valve device is in the first switching state, thus at least the mentioned portion of the coolant flowing through the first cooling circuit flows through the valve device, through the flow branch, and through the second radiator, and is cooled by way of the second radiator. The second radiator is thus assigned or switched to the first cooling circuit in the first switching state or by the first switching state, and therefore at least the portion of the coolant flowing through the first cooling circuit is cooled both by way of the first radiator and by way of the second radiator. In this case, provision may in particular be made for the flow branch and thus the second radiator to be fluidically separated from the second cooling circuit, in particular by way of the valve device, in the first switching state, and/or for cooling, effected by way of the second radiator, of at least a predominant portion of the coolant flowing through the second cooling circuit to be omitted in the first switching state. In other words, it is conceivable for at least a predominant portion, that is to say at least more than half of the coolant flowing through the second cooling circuit, to not be cooled by the second radiator in the first switching state, in particular since in the first switching state at least the predominant portion of the coolant flowing through the second cooling circuit does not or cannot flow through the flow branch and thus through the second radiator, but rather preferably bypasses the flow branch and the second radiator.

In the second switching state, the second cooling circuit is fluidically connected to the flow branch via the valve device, as a result of which at least a portion of the coolant flowing through the first cooling circuit can be guided through the second radiator and is to be cooled by way of the second radiator. In other words, the coolant flows through the second cooling circuit when the valve device is in the second switching state, thus at least the mentioned portion of the coolant flowing through the second cooling circuit flows through the valve device, through the flow branch, and through the second radiator, and is cooled by way of the second radiator. The second radiator is thus assigned or switched to the second cooling circuit in the second switching state or by the second switching state, and therefore at least the portion of the coolant flowing through the second cooling circuit is cooled by way of the second radiator. In this case, provision may in particular be made for the flow branch and thus the second radiator to be fluidically separated from the first cooling circuit, in particular by way of the valve device, in the second switching state, and/or for cooling, effected by way of the second radiator, of at least a predominant portion of the coolant flowing through the first cooling circuit to be omitted in the second switching state. In other words, it is conceivable for at least a predominant portion, that is to say at least more than half of the coolant flowing through the first cooling circuit, to not be cooled by the second radiator in the second switching state, in particular since in the second switching state at least the predominant portion of the coolant flowing through the first cooling circuit does not or cannot flow through the flow branch and thus through the second radiator, but rather preferably bypasses the flow branch and the second radiator.

Overall, it is apparent that the valve device can be switched between the first switching state and the second switching state, in order to, as a result, switch the second radiator to the first cooling circuit or to the second cooling circuit in a selective manner and thus as required, that is to say to connect the second radiator to the first cooling circuit or to the second cooling circuit in a selective manner and thus as required.

In order to be able to implement a particularly high cooling performance, provision is made in one embodiment of the disclosure for the first radiator to be in the form of a first ambient-air radiator which can be flowed around by air, in particular ambient air, and by way of which the coolant flowing through the first cooling circuit is to be cooled by way of the air flowing around the first ambient-air radiator.

In this case, the second radiator is in the form of a second ambient-air radiator which can be flowed around by air, in particular ambient air, and by way of which the coolant flowing through the second cooling circuit is to be cooled by way of the air flowing around the second ambient-air radiator. The ambient-air radiators are preferably respective individual components, the first ambient-air radiator being an additional radiator external to the second ambient-air radiator or vice versa. By way of example, when the motor vehicle is traveling, in particular traveling forward, the respective ambient-air radiator can be flowed around by relative wind and thus by air, in particular ambient air. By way of the respective ambient-air radiator, the coolant flowing through the respective cooling circuit and thus flowing through the respective ambient-air radiator can be cooled by way of the air flowing around the respective ambient-air radiator, in particular due to the fact that heat passes from the coolant flowing through the respective ambient-air radiator via the respective ambient-air radiator to the air flowing around the respective ambient-air radiator.

A further embodiment is distinguished by at least one heat exchanger, which is also referred to as first heat exchanger, which is fluidically connected to one of the cooling circuits and through which at least the aforementioned portion or at least a further portion of the coolant flowing through the one cooling circuit can flow. The at least one heat exchanger is provided in addition to the radiators, such that the at least one heat exchanger is preferably arranged outside of the radiators and such that the radiators are preferably arranged outside of the heat exchanger. The at least one heat exchanger is also arranged in a fluid circuit through which a further fluid can flow, as a result of which the at least one heat exchanger can be used to exchange heat between the further fluid and the coolant flowing through the at least one heat exchanger. The fluid circuit is preferably fluidically separated from the one cooling circuit and preferably also from the other cooling circuit. In other words, provision is preferably made for the fluid circuit to be fluidically separated from both cooling circuits. In particular, the fluid circuit is provided in addition to the cooling circuits. By way of example, the one cooling circuit is the first cooling circuit, and therefore the other cooling circuit is then the second cooling circuit. If, for example, the one cooling circuit is the second cooling circuit, then the other cooling circuit is the first cooling circuit.

Since the at least one heat exchanger is both fluidically connected to the one cooling circuit and arranged in a fluid circuit which is in particular provided in addition to the cooling circuits, the at least one heat exchanger can be flowed through both by the portion or the further portion of the coolant and by the further fluid flowing through the fluid circuit. The at least one heat exchanger can be used to transfer, that is to say exchange, heat between the further fluid flowing through the at least one heat exchanger and the coolant flowing through the at least one heat exchanger. By way of example, the at least one heat exchanger is a radiator for cooling the further fluid which is for example in the form of refrigerant. In particular, the at least one heat exchanger is a condenser for condensing the further fluid which is for example in the form of refrigerant.

In order to implement a particularly good cooling performance of the cooling system overall, provision is made in a further refinement of the disclosure for the at least one heat exchanger to be in the form of a cooling element which can be used to transfer heat from the further fluid to the coolant flowing through the at least one heat exchanger for the purpose of cooling the further fluid.

In a particularly advantageous embodiment of the disclosure, provision is made of a second heat exchanger which is arranged in the other cooling circuit and in the fluid circuit through which the further fluid can flow, and through which both the coolant flowing through the other cooling circuit and the further fluid can flow as a result, said second heat exchanger being provided in addition to the at least one heat exchanger and being able to be used to transfer heat between the coolant flowing through the second heat exchanger and the further fluid. In this way, particularly good cooling can be achieved.

Here, it has been shown to be particularly advantageous if the second heat exchanger is in the form of a cooling device which can be used to transfer heat from the coolant flowing through the second heat exchanger to the further fluid for the purpose of cooling the coolant flowing through the second heat exchanger. The second heat exchanger is also referred to as chiller. By way of the second heat exchanger, the further fluid can be used to cool the coolant flowing through the second cooling circuit, as a result of which for example the heat source can be cooled in a particularly effective and efficient manner.

In a further, particularly advantageous embodiment of the disclosure, the fluid circuit is a refrigerant circuit of an air-conditioning device which can be operated as a compression refrigeration machine and which is also referred to as air-conditioning system and the refrigerant circuit of which can be flowed through by the further fluid as refrigerant. As a result, a particularly advantageous cooling can be constituted.

Here, it has been shown to be particularly advantageous if the at least one heat exchanger (first heat exchanger) is in the form of a condenser for condensing the refrigerant. In this way, a particularly effective and efficient cooling can be implemented.

In a further, particularly advantageous refinement of the disclosure, the cooling system comprises a flow path which is fluidically connected at a first connecting point, which is arranged downstream of the first radiator and upstream of the drive machine in a flow direction of the coolant flowing through the first cooling circuit, to the first cooling circuit. In this case, the first cooling circuit is the one cooling circuit, and therefore the second cooling circuit is the other cooling circuit. Furthermore, the flow path is fluidically connected at a second connecting point, which is arranged downstream of the drive machine and upstream of the first radiator in the flow direction of the coolant flowing through the first cooling circuit. As a result, the flow path can be flowed through at least by the portion of the coolant flowing through the first cooling circuit. The at least one heat exchanger (first heat exchanger) is arranged both in the flow path and in the fluid circuit through which the further fluid can flow, and can be flowed through both by the coolant flowing through the flow path and by the further fluid as a result. In the first switching state, the flow branch is fluidically connected to the flow path via the valve device and to the first cooling circuit via the flow path, such that, for example, in the first switching state at least the portion of the coolant flowing through the first cooling circuit can be fed to the valve device at least via a subregion of the flow path and can be introduced into the flow branch via the valve device. In the first switching state, at least the portion of the coolant flowing through the first cooling circuit can thus be guided via the flow path through the second radiator and be cooled by way of the second radiator. In this way, particularly good cooling can be achieved. In particular, the flow path can be provided in addition to the cooling circuits and in addition to the flow branch.

Due to the fact that the valve device can be switched between the switching states, the flow branch, in particular in comparison to conventional solutions, is not a fixed part of the first or second cooling circuit and is not a fixed part of the flow path, but rather the flow branch can be switched, in particular via the flow path, to the first cooling circuit or to the second cooling circuit in a selective manner and thus as required, thus can be fluidically connected to the first cooling circuit or to the second cooling circuit in a selective manner.

By way of example, at least a portion of the coolant flowing through the first cooling circuit can be branched off from the first cooling circuit at the first connecting point and be introduced into the flow path and then flow through the flow path, thus flow from the first connecting point to the second connecting point. At the second connecting point, the branched-off coolant flowing through the flow path can flow out of the flow path and flow, thus be introduced, (back) into the first cooling circuit. Since the first connecting point is arranged downstream of the first radiator and upstream of the drive machine and the second connecting point is arranged downstream of the drive machine and upstream of the first radiator, the flow path and thus the coolant flowing through the flow path bypass the drive machine. This means that on its way from the first connecting point to the second connecting point the coolant flowing through the flow path does not flow through the drive machine, that is to say bypasses the drive machine.

The valve device, which is also referred to simply as valve, is arranged, for example, in the flow path upstream of the at least one heat exchanger. This means that the valve device may be arranged upstream of the at least one heat exchanger and downstream of the first connecting point in the flow direction of the coolant flowing through the flow path.

Provision may in particular be made for the flow branch to be fluidically connected to the second cooling circuit via the valve device, that is to say by way of the valve device, in the second switching state, as a result of which the second radiator is arranged in the second cooling circuit. On its way through the second cooling circuit the coolant flowing through the second cooling circuit thus flows through the second radiator and, for example, through the heat source and is thus in particular also cooled by way of the second radiator in the second switching state. It is thus for example possible for a strong cooling of the coolant flowing through the second cooling circuit and thus for example of the heat source to be implemented in the second switching state, that is to say by the second switching state.

By way of example, in the second switching state, the flow branch is fluidically separated from the flow path by way of the valve device in such a way that, on its way from the first connecting point to the second connecting point, the coolant flowing through the flow path can be guided, that is to say flows, from the first connecting point via the valve device and in particular the at least one heat exchanger to the second connecting point while bypassing the second radiator. In other words, on its way from the first connecting point to the second connecting point, the coolant flowing through the flow path flows from the first connecting point via the valve device in particular to the at least one heat exchanger and for example via the at least one heat exchanger to the second connecting point, but without flowing through the second radiator in the process and thus without being cooled by way of the second radiator. Again, in other words, on its way from the first to the second connecting point, the coolant flowing through the flow path flows from the first connecting point through the valve device, then for example through the at least one heat exchanger and subsequently to the second connecting point, wherein, on its way from the first to the second connecting point, the coolant flowing through the flow path bypasses the second radiator, thus does not flow through the second radiator, and, on its way from the first connecting point to the second connecting point, the coolant flowing through the flow path also does not flow through the second cooling circuit. This also means that in the second switching state the ambient-air radiator is not arranged in the flow path between the connecting points.

In the first switching state, the flow branch is fluidically connected to the flow path via the valve device, that is to say by way of the valve device, as a result of which the second radiator is arranged downstream of the first connecting point and for example upstream of the at least one heat exchanger and upstream of the second connecting point in the flow path. In the first switching state, on its way from the first connecting point to the second connecting point, which is arranged downstream of the first connecting point in the flow direction of the coolant flowing through the flow path, the coolant flowing through the flow path also flows through the second radiator, specifically preferably before the coolant flowing through the flow path flows through the at least one heat exchanger. In other words, on its way from the first connecting point to the second connecting point, the coolant flowing through the flow path firstly flows, for example, through the second ambient-air radiator and is thus firstly cooled by way of the second ambient-air radiator. Subsequently, on its way from the first to the second connecting point, the coolant flowing through the flow path flows, for example, through the at least one heat exchanger, whereupon for example the coolant flowing through the flow path flows to the second connecting point and is introduced into the first cooling circuit at the second connecting point.

In the first switching state, the second cooling circuit is for example separated from the flow branch by way of the valve device in such a way that in the first switching state at least a predominant portion and thus at least more than half of the coolant flowing through the second cooling circuit, in particular all of the coolant flowing through the second cooling circuit, does not flow through the flow branch and thus does not flow through the second ambient-air radiator. In the first switching state, the coolant flowing through the second cooling circuit is thus at least predominantly not cooled by way of the second radiator (and also for example not by way of the first radiator).

Since, for example, in the first switching state the second radiator is arranged upstream of the at least one heat exchanger in the flow path, a preliminary cooling with respect to the at least one heat exchanger is provided in the first switching state, since the coolant flowing through the flow path is firstly cooled by way of the second radiator and then flows through the at least one heat exchanger. In this way, the coolant flowing through the flow path can have an advantageously low temperature when the coolant flowing through the flow path flows through the at least one heat exchanger. Consequently, it is for example possible for the further fluid to be cooled in a particularly advantageous manner by way of the at least one heat exchanger, in particular by a transfer of heat from the further fluid via the at least one heat exchanger to the coolant which flows through the flow path and which is cooled by way of the second radiator. In this way, the further fluid can be cooled particularly strongly.

It is thus apparent that the valve device, which is also referred to simply as valve, makes it possible to perform switching as required, in particular between the mentioned preliminary cooling and a direct cooling of the heat source. It is also apparent that the valve device can be used to assign or switch the second radiator, which is provided in addition to the first radiator, to the second cooling circuit and thus for example to the heat source (second switching state) or to the flow path and thus to the at least one heat exchanger (first switching state) as required, that is to say in a selective manner.

Due to the fact that the valve device can be switched between the switching states in a selective manner and thus as required, additional heat exchangers or radiators can be avoided or the number of such radiators or heat exchangers can be kept particularly low. In other words, it is not necessary for a respective, dedicated, separate radiator to be assigned both to the flow path or to the first cooling circuit and to the second cooling circuit, and therefore the number of parts and thus the weight, the costs, and the installation space requirement of the cooling system can be kept particularly low. In particular, a number and size of cooling areas can be kept low, and therefore particularly advantageous aerodynamics of the motor vehicle can be achieved. At the same time, an advantageous cooling performance can be achieved, since, in particular depending on the driving or loading situation, the coolant flowing through the second cooling circuit or the coolant flowing through the first cooling circuit and/or through the flow path can be cooled in a selective manner by way of the second radiator.

In order to be able to implement a particularly good cooling, in a further embodiment, the at least one heat source which is provided in addition to the drive machine and which is to be cooled by way of the coolant flowing through the second cooling circuit is arranged in the second cooling circuit.

Here, it has been shown to be particularly advantageous if the at least one heat source is an electrical energy store for in particular electrochemically storing electrical energy. By way of example, the electrical energy store is a battery, in particular a secondary battery. Preferably, the electrical energy store is a high-voltage component, the electrical voltage, in particular electrical operating and rated voltage, of which is preferably greater than 50 V, in particular greater than 60 V, and is very preferably several hundred volts (V). By way of example, the electrical energy store is a high-voltage battery (HV battery). Since the electrical energy store is preferably in the form of a high-voltage component, the electrical energy store is also referred to as high-voltage store (HVS). By way of example, the aforementioned electric machine, which is provided or configured for the electrical, in particular purely electrical, driving of the motor vehicle, can be operated in motor operation and thus as an electric motor, which can be used to drive the motor vehicle electrically, in particular purely electrically. In order to operate the electric machine in the motor operation, the electric machine is supplied with the electrical energy stored in the energy store. Since the electrical energy store is arranged in the second cooling circuit, and since the second cooling circuit can be flowed through by the coolant, the electrical energy store can be cooled by way of the coolant flowing through the second cooling circuit.

A further embodiment is distinguished in that the at least one heat source is a charge-air radiator which can be used to cool air, also referred to as combustion air or charge air, which is or has been compressed by way of at least one compressor and which is to be fed to at least one combustion chamber of a combustion engine of the motor vehicle. The compressed air can thus be subjected to particularly good cooling in particular in the second switching state, particularly if the combustion engine provides a high power over a relatively long period of time.

In order to be able to switch between the switching states particularly rapidly and as required, such that a particularly advantageous cooling can be constituted as required, provision is made in a further refinement of the disclosure for the valve device to be able to be switched from at least one of the switching states to the other switching state electrically, that is to say using electrical energy or electrical current.

In order to be able to switch between the switching states as required and in a manner which is favorable in terms of costs and weight, in a further refinement of the disclosure, a spring device, which is preferably in the form of a mechanical spring or which comprises at least one mechanical spring, is provided and can be used to switch the valve device from the other switching state to the one switching state.

In order to implement a particularly advantageous cooling, provision is made in a further refinement of the disclosure for the at least one heat exchanger to be arranged upstream of the second heat exchanger in the fluid circuit in the flow direction of the further fluid flowing through the fluid circuit.

Provision is preferably made for the further fluid flowing through the fluid circuit to flow through the second heat exchanger in the liquid state of the further fluid. The second heat exchanger is thus preferably a liquid-to-liquid heat exchanger which can be used to transfer heat between the liquid coolant and the further fluid, which is in liquid form at least in the second heat exchanger.

A second aspect of the disclosure relates to a motor vehicle which is preferably in the form of an automobile, in particular in the form of a passenger car, and which comprises a cooling system according to the first aspect of the disclosure. Advantages and advantageous refinements of the first aspect of the disclosure should be regarded as advantages and advantageous refinements of the second aspect of the disclosure and vice versa.

BRIEF DESCRIPTION OF THE DRAWINGS

Further details of the disclosure will emerge from the following description of a preferred exemplary embodiment with the associated drawings, in which.

In the figures, identical or functionally identical elements are provided with the same reference designations.

DETAILED DESCRIPTION OF THE DRAWINGS

Figure 1:
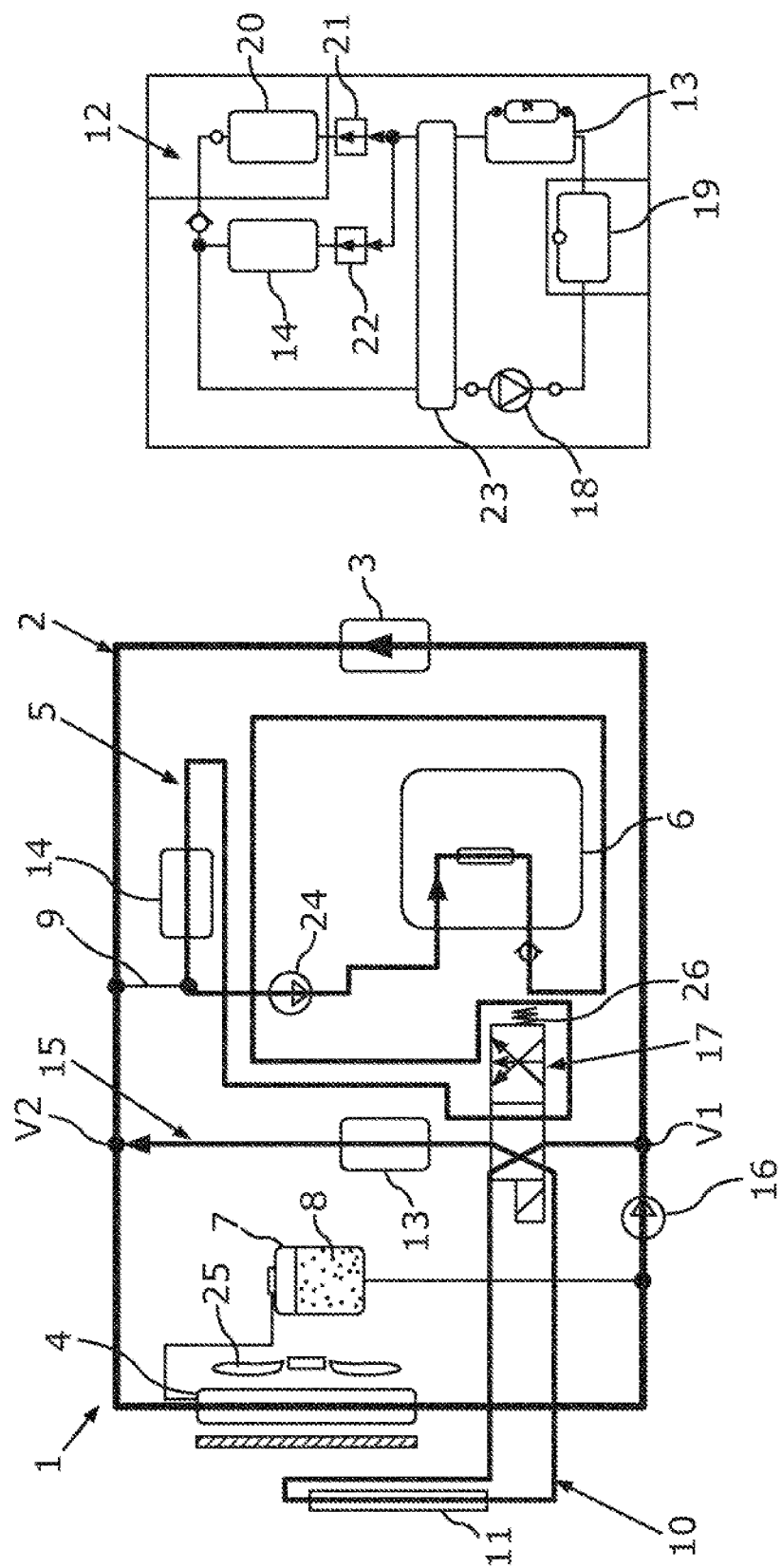
FIG. 1 shows a schematic illustration of a first embodiment of a cooling system for a motor vehicle, a valve device of the cooling system being in a first switching state.
Figure 2:
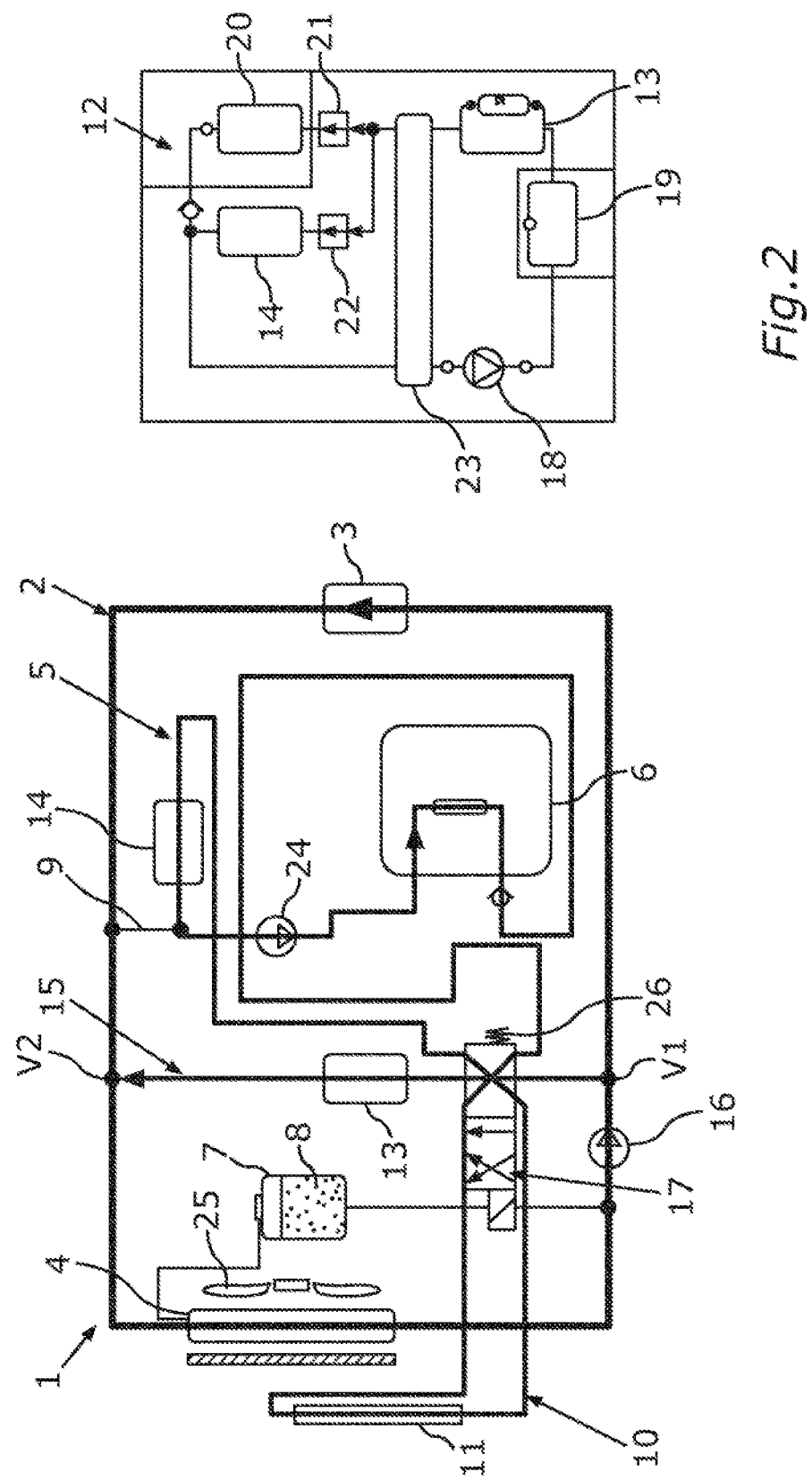
FIG. 2 shows a further schematic illustration of the cooling system according to the first embodiment, the valve device being in a second switching state.

FIGS. 1 and 2 show a schematic illustration of a first embodiment of a cooling system 1 for a motor vehicle which is preferably in the form of an automobile, in particular a passenger car. The cooling system 1 comprises a first cooling circuit 2 through which a preferably liquid coolant can flow. Arranged in the first cooling circuit 2 is a drive machine 3 which can be used to drive the motor vehicle. The drive machine 3 is, for example, a combustion engine or alternatively an electric machine, which can for example be used to drive the motor vehicle electrically, in particular purely electrically. In addition, a subregion of the drive machine 3 can be flowed through by the coolant flowing through the first cooling circuit 2, as a result of which the drive machine 3 can be cooled by way of the coolant flowing through the first cooling circuit 2. The drive machine 3 can in particular be cooled in that heat passes from the drive machine 3 to the coolant which flows through the first cooling circuit 2 and thus through the drive machine 3. In particular, the cooling circuit 2 is a high-temperature cooling circuit (HT cooling circuit).

The cooling system 1 comprises a first ambient-air radiator 4 which is a first radiator and is arranged in the first cooling circuit 2 and through which accordingly the coolant flowing through the first cooling circuit 2 can flow. The first ambient-air radiator 4 is also referred to as high-temperature radiator (HT radiator). The first ambient-air radiator 4 is also referred to as first radiator and can be flowed through by air, in particular ambient air. This in particular means that, when the motor vehicle is traveling, in particular traveling forward, air, in particular ambient air, forms relative wind which can flow around the first ambient-air radiator 4. By way of the ambient-air radiator 4, the coolant flowing through the ambient-air radiator 4 can be cooled by way of the air flowing around the ambient-air radiator 4.

The cooling system 1 also comprises a second cooling circuit 5 through which the coolant can flow and which is for example in the form of a low-temperature circuit (LT circuit). An electrical energy store 6 is arranged in the second cooling circuit 5. It is thus for example possible for at least a subregion of the energy store 6 to be flowed through by the coolant flowing through the cooling circuit 5, and therefore the energy store 6 can be cooled by way of the coolant flowing through the cooling circuit. This is effected in particular by a transfer of heat from the energy store to the coolant flowing through the cooling circuit 5 and thus through the energy store 6. In the exemplary embodiment shown in FIG. 1, the cooling system 1 comprises an expansion tank 7, which is an expansion tank common to the cooling circuits 2 and 5. A quantity of coolant, denoted by 8 in FIG. 1, is received in the expansion tank 7. By way of the expansion tank 7 and in particular by way of the quantity 8 which is at least temporarily received in the expansion tank 7, quantity and/or volume fluctuations of the coolant can be compensated, that is to say equalized, in both cooling circuits 2 and 5. To this end, the expansion tank 7 is connected, in particular directly, to the cooling circuit 2, and therefore coolant from the cooling circuit 2 can flow into the expansion tank 7 and coolant from the expansion tank 7 can flow into the cooling circuit 2. In order to avoid the need to use a second expansion tank, a very thin supply line 9, which thus functions as a throttle and/or which comprises a throttle, is provided, via which the cooling circuits 2 and 5 can be fluidically connected to one another, in particular and preferably exclusively for the purpose of being able to compensate, by way of the supply line 9 and the cooling circuit 2, for volume and/or quantity fluctuations of the coolant in the cooling circuit 5 by way of the expansion tank 7 and by way of the quantity 8 of coolant received in the expansion tank 7.

Furthermore, the cooling system 1 comprises a flow branch 10 through which the coolant can flow. Arranged in the flow branch 10 is a second ambient-air radiator 11 which can be flowed around by air, in particular ambient air, and which is a second radiator and is provided in addition to the ambient-air radiator 4. When the motor vehicle is traveling, in particular traveling forward, as mentioned above, the ambient-air radiator 11 is also flowed around by the relative wind and thus by the air forming the relative wind, and therefore the coolant flowing through the flow branch 10 is to be cooled or is cooled by way of the ambient-air radiator 11.

In the exemplary embodiment shown in the figures, the cooling system 1 comprises a fluid circuit, which is provided in addition to the cooling circuits 2 and 5, in the form of a refrigerant circuit 12. The refrigerant circuit 12 can be flowed through by a further fluid in the form of a refrigerant. The refrigerant is in particular used to cool air which is fed or is to be fed to the interior of the motor vehicle. To this end, arranged in the refrigerant circuit 12 is a first heat exchanger which is in the form of a condenser 13 and which is configured to cool and, as a result, to condense the refrigerant. By way of example, the refrigerant flows in the liquid state of the refrigerant through at least a subregion of the condenser 13 and/or the refrigerant flows in the liquid state of the refrigerant out of the condenser 13, since the refrigerant is condensed and thus liquefied by way of the condenser 13.

Arranged in the refrigerant circuit 12 is a second heat exchanger, which is referred to as chiller 14. It is apparent from FIG. 1 that the condenser 13 is arranged upstream of the chiller 14 in the flow direction of the refrigerant flowing through the refrigerant circuit 12.

In order to then be able to implement a particularly advantageous cooling in a manner which is particularly favorable in terms of costs, weight and installation space, the cooling system 1 comprises a flow path 15 which is fluidically connected at a first connecting point V1 and at a second connecting point V2 to the first cooling circuit 2. The connecting point V1 is arranged downstream of the ambient-air radiator 4 and upstream of the drive machine 3 in the flow direction of the coolant flowing through the cooling circuit 2. Arranged in the cooling circuit 2 is a pump 16 which can or is used to convey the coolant through the cooling circuit 2. It is apparent from FIG. 1 that the pump 16 is arranged downstream of the ambient-air radiator 4 and upstream of the drive machine 3, the connecting point V1 being arranged downstream of the pump 16 and upstream of the drive machine 3. The connecting point V2 is arranged downstream of the drive machine 3 and upstream of the first ambient-air radiator 4 in the flow direction of the coolant flowing through the first cooling circuit 2. The condenser 13 (the at least one heat exchanger) is thus arranged both in the refrigerant circuit 12 and in the flow path 15, and therefore the condenser 13 can be flowed through both by the refrigerant and by the preferably liquid coolant flowing through the flow path 15. By way of the condenser 13, the refrigerant can in particular be cooled, and as a result condensed, in such a way that heat passes from the refrigerant flowing through the condenser 13 to the coolant flowing through the condenser 13 via the condenser 13. As a result, the condenser 13 functions or operates as a cooling element for cooling the refrigerant (further fluid). Since the condenser 13 is arranged in the flow path 15, the condenser 13 is arranged downstream of the connecting point V1 and upstream of the connecting point V2 in the flow direction of the coolant flowing through the flow path 15. By way of the flow path 15, at least a portion of the coolant flowing through the cooling circuit 2 can be branched off from the cooling circuit 2 and be introduced into the flow path 15, the branched-off portion of the coolant being able to flow through the flow path 15 and in so doing flow from the connecting point V1 to the connecting point V2. At the connecting point V2, the coolant flowing through the flow path 15, that is to say the branched-off portion, is introduced back into the cooling circuit 2, whereupon the portion can flow, in particular with the rest of the coolant flowing through the cooling circuit 2, back to the ambient-air radiator 4 and through said ambient-air radiator.

It is also apparent that the flow path 15 is connected in parallel with the drive machine 3 in terms of flow, since the coolant flowing through the flow path 15 bypasses the drive machine 3, thus does not flow through the drive machine 3.

The cooling system 1 also comprises a valve device 17, which is also referred to simply as valve and is for example in the form of a 6/2-way valve, which is also referred to as switching valve. The valve device 17 can be switched between at least a first switching state shown in FIG. 1 and at least a second switching state shown in FIG. 2. The valve device 17 is arranged upstream of the condenser 13 and downstream of the connecting point V1 in the flow direction of the coolant flowing through the flow path 15.

In the second switching state shown in FIG. 2, the flow branch 10 is fluidically connected to the second cooling circuit 5 via the valve device 17, wherein, in the second switching state, the second ambient-air radiator 11 is arranged in the second cooling circuit 5. In particular, in the second switching state, the flow branch 10 is separated from the flow path 15 by way of the valve device 17 in such a way that, on its way from the connecting point V1 to the connecting point V2, the coolant flowing through the flow path 15 can be guided or flows from the first connecting point V1 via the valve device 17 and the condenser 13 to the second connecting point V2 while bypassing the second ambient-air radiator 11.

Furthermore, it is apparent from FIGS. 1 and 2 that the chiller 14 is arranged both in the refrigerant circuit 12 and in the second cooling circuit 5 and thus can be flowed through both by the refrigerant and by the coolant flowing through the second cooling circuit 5. It is apparent that, in the second switching state, the second ambient-air radiator 11 is arranged upstream of the chiller 14 and downstream of the electrical energy store 6 in the second cooling circuit 5, the chiller 14 being arranged upstream of the energy store 6 in the flow direction of the coolant flowing through the second cooling circuit 5. This means that in the second switching state the flow branch 10 is fluidically connected to the second cooling circuit 5 via the valve device 17 in such a way that the second ambient-air radiator 11 is arranged upstream of the chiller 14 and downstream of the electrical energy store 6 in the second cooling circuit 5. In particular, the chiller 14 may function as a cooling device by way of which the coolant flowing through the cooling circuit 5 is to be cooled or is cooled, in particular in such a way that heat passes from the coolant flowing through the chiller 14 to the refrigerant flowing through the chiller 14 via the chiller 14. After the chiller 14, the coolant which is cooled in particular by way of the chiller 14 can flow through the energy store 6, as a result of which the energy store 6 can be advantageously cooled. In particular, in the second switching state, the coolant, after it has flowed through the energy store 6, can flow through the second ambient-air radiator 11 and is thus cooled by way of the second ambient-air radiator 11, whereupon the coolant can flow or flows to and through the chiller 14.

In the first switching state, the flow branch 10 is fluidically connected to the flow path 15 via the valve device 17, as a result of which the second ambient-air radiator 11 is arranged downstream of the first connecting point V1 and upstream of the condenser 13 in the flow path 15 in the flow direction of the coolant flowing through the flow path 115. It is apparent from FIGS. 1 and 2 that the valve device 17 can be used to assign, allocate or switch the ambient-air radiator 11, which is provided in addition to the ambient-air radiator 4, to the cooling circuit 5 and thus to the energy store 6 and the chiller or to the flow path 15 and thus to the condenser 13 as required and thus in a selective manner. In particular, in the first switching state, a preliminary cooling for the condenser 13 can be implemented by way of the ambient-air radiator 11.

In the first switching state shown in FIG. 1, the second cooling circuit 5 is separated from the flow branch 10 by way of the valve device 17, in such a way that at least a predominant portion of the coolant flowing through the second cooling circuit 5 does not flow through the flow branch 10 and thus does not flow through the second ambient-air radiator 11.

The switching states of the valve device 17 relate in particular at least to a respective state in which a flow of coolant through the supply line 9 is omitted, that is to say a compensation of volume and/or quantity fluctuations by way of the expansion tank 7 is omitted. Again, in other words, the supply line 9 is not considered in the case of the switching states.

The refrigerant circuit 12 is a refrigerant circuit of an air-conditioning device of the motor vehicle, said air-conditioning device being in the form of or being able to be operated as a compression refrigeration machine. In this case, a refrigerant compressor 18 is arranged in the refrigerant circuit 12 and can be used to convey the refrigerant through the refrigerant circuit 12. The refrigerant can also be compressed by way of the refrigerant compressor 18. The refrigerant compressor 18 is arranged downstream of the chiller 14 and upstream of the condenser 13 in the flow direction of the refrigerant flowing through the refrigerant circuit 12. In the refrigerant circuit 12, a further condenser 19, which is also referred to as or is in the form of a heat pump condenser, is for example arranged upstream of the condenser 13 and downstream of the refrigerant compressor 18.

In the refrigerant circuit 12, an evaporator 20, which is connected in parallel with the chiller 14 in terms of flow, is arranged downstream of the condenser 13. By way of the evaporator 20, the refrigerant is evaporated, as a result of which for example air which flows around and/or through the evaporator 20 is cooled. The air cooled by way of the evaporator 20 is, for example, fed to the interior of the motor vehicle. An expansion valve 21 for expanding the refrigerant is arranged downstream of the condenser 13 and upstream of the evaporator 20. In this case, it is conceivable for a further expansion valve 22 to be arranged downstream of the condenser 13 and upstream of the chiller 14 and to be able to be used to expand the refrigerant. The expansion valve 21 is connected in parallel with the chiller 14 and in parallel with the expansion valve 22 in terms of flow, such that the expansion valve 22 is connected in parallel with the evaporator 20 and in parallel with the expansion valve 21 in terms of flow. The refrigerant compressor 18 is arranged downstream of the evaporator 20 and the chiller 14.

An internal heat exchanger 23 may also be arranged in the refrigerant circuit 12, said internal heat exchanger being arranged partially upstream of the refrigerant compressor 18 and downstream of the chiller 14 and the evaporator 20 and partially downstream of the condenser 13 and upstream of the chiller 14 and the evaporator 20. By way of the heat exchanger 23, it is for example possible for heat from the refrigerant which flows from the condenser 13 to the chiller 14 and to the evaporator 20 to be transferred to the refrigerant which flows from the evaporator 20 and the chiller 14 to the refrigerant compressor 18. This makes it possible to implement a particularly efficient operation of the air-conditioning device.

Furthermore, a pump 24, which is provided in addition to the pump 16, is arranged in the cooling circuit 5 and can be or is used to convey the coolant through the second cooling circuit 5. It is conceivable for the pump 16 and/or the pump 24 to be in the form of an electrically operable pump.

Furthermore, a fan 25, which is also referred to as blower, is assigned at least to the ambient-air radiator 4 and can be used to convey air. The air conveyed by way of the fan 25 flows around the ambient-air radiator 4, as a result of which the ambient-air radiator 4 can then also be used to cool the coolant flowing through the ambient-air radiator 4, if the motor vehicle is at a standstill or is only traveling slowly. It is conceivable for the ambient-air radiators 4 and 11 to be arranged together or one after the other in a vehicle longitudinal direction, in particular in such a way that one of the ambient-air radiators 4 and 11 is at least partially overlapped toward the front in the vehicle longitudinal direction by the respectively other ambient-air radiator 11 or 4, respectively. The fan 25 is preferably an electric fan, thus an electrically operable fan.

By way of example, the valve device 17 can be switched electrically from the first to the second switching state and can for example be held in the second switching state. In this case, provision may for example be made of a spring device 26 which can be used to switch the valve device 17 from the second switching state to the first switching state.

Figure 3:
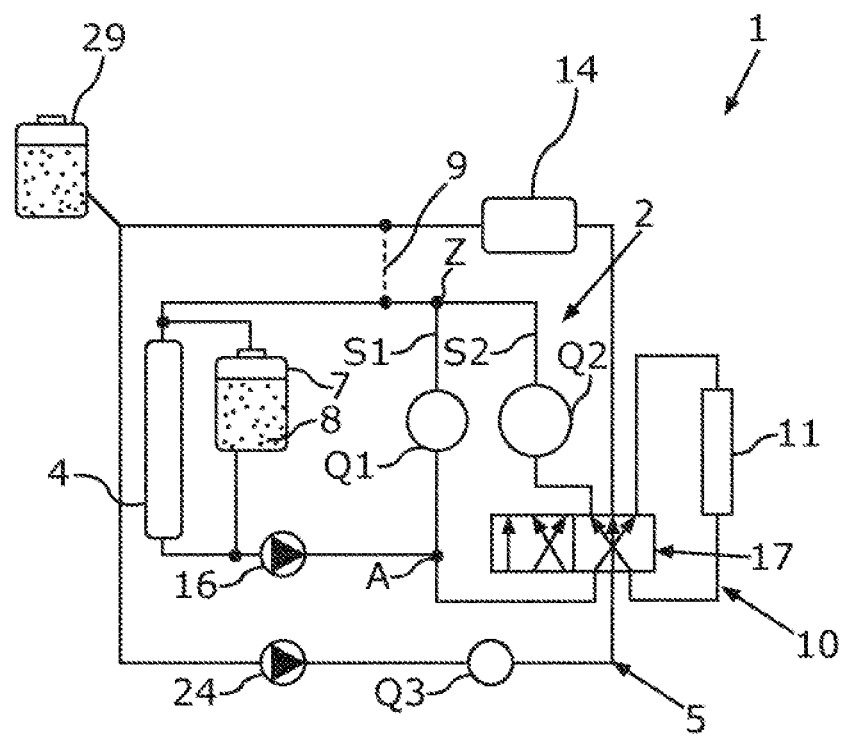
FIG. 3 shows a schematic illustration of a second embodiment of the cooling system.

FIG. 3 shows a schematic illustration of a second embodiment of the cooling system 1. It is conceivable for two heat sources Q1 and Q2 which are configured separately from one another and are thus individual to be arranged in the cooling circuit 2, the heat sources Q1 and Q2 being arranged or connected in parallel with one another in terms of flow, that is to say in the flow direction of the coolant flowing through the cooling circuit 2. To this end, for example, the heat source Q1 is arranged in a first branch S1 of the cooling circuit 2, and the heat source Q2 is arranged in a second branch S2 of the cooling circuit 2, the branches S1 and S2 being connected or arranged in parallel with one another in terms of flow. In particular, it is conceivable for one of the heat sources Q1 and Q2, in particular the heat source Q2, to be the drive machine 3 which is for example in the form of an electric machine. Furthermore, it is conceivable for the other of the heat sources Q1 and Q2, in particular the heat source Q1, to be a second drive machine which is provided in addition to the drive machine 3 and which can be used to drive the motor vehicle, the second drive machine being able to be an in particular further electric machine for the electrical, in particular purely electrical, driving of the motor vehicle, and the second electric machine being a combustion engine. It is also conceivable for the heat source Q1 to be the drive machine 3, it being conceivable for the heat source Q2 to then for example be the second drive machine.

It is apparent that the cooling circuit 2 is branched at a branching point A, which is in particular arranged upstream of the heat sources Q1 and Q2 and downstream of the ambient-air radiator 4, into the flow branches S1 and S2, which are combined again at a combining point Z. The combining point Z is arranged downstream of the heat sources Q1 and Q2 and upstream of the ambient-air radiator 4. Thus, for example, if the coolant flows through the cooling circuit 2, a first portion of the coolant flowing through the cooling circuit 2 flows through the branch S1 and thus through the heat source Q1, and a second portion of the coolant flowing through the cooling circuit 2 flows through the branch S2 and thus through the heat source Q2. Thus, the heat source Q1 is cooled by way of the first portion of the coolant flowing through the cooling circuit 2, and the heat source Q2 is cooled by way of the second portion of the coolant flowing through the cooling circuit 2. In particular, at the branching point A, a flow of the coolant flowing through the cooling circuit 2, said flow comprising the first portion and the second portion and also being referred to as total flow, is divided into the first portion and the second portion, the first portion and the second portion being combined again at the combining point Z, in particular to form the total flow. In particular, it is conceivable for the total flow or at least a portion, in particular at least a predominant portion, of the total flow to be able to flow through the ambient-air radiator 4 and be cooled by way of the ambient-air radiator 4.

In FIG. 3, the valve device 17 is in the first switching state, in which the first cooling circuit 2, in particular via the branch S2, is fluidically connected to the flow branch 10 via the valve device 17, as a result of which at least a portion of the coolant flowing through the first cooling circuit 2, in particular the first portion of the coolant flowing through the first cooling circuit 2, can be guided through the second ambient-air radiator 11 and is to be cooled by way of the second ambient-air radiator 11, thus is guided through the second ambient-air radiator 11 and cooled by way of the second ambient-air radiator 11. After the second portion of the coolant flowing through the cooling circuit 2 has been cooled by way of the ambient-air radiator 11, the coolant flowing through the flow branch 10, thus the second portion of the coolant, flows out of the flow branch 10 via the valve device 17 and into the cooling circuit 2, in particular into the branch S2, wherein the coolant cooled by way of the ambient-air radiator 11 flows through the heat source Q2 and cools thereby. It is apparent that the valve device 17 is arranged in the flow branch 10 and in the branch S2, in such a way that the valve device 17 is arranged upstream of the heat source Q2 and in particular downstream of the branching point A in the flow direction of the coolant flowing through the branch S2.

In the second embodiment, a heat source Q3 is arranged in the second cooling circuit 5, said heat source being provided in addition to the heat sources Q1 and Q2. The heat sources Q1, Q2 and Q3 are each arranged outside of one another. In particular, the heat source Q3 is the electrical energy store 6. Again, in other words, the energy store 6 is a heat source which is to be cooled, that is to say is cooled, by way of the coolant flowing through the second cooling circuit 5, wherein, in the second embodiment, the heat source which is arranged in the second cooling circuit 5 and which is to be cooled by way of the coolant flowing through the second cooling circuit 5 is the heat source Q3.

In the first switching state shown in FIG. 3, on its way from the heat source Q3 to the chiller 14, the coolant flowing through the cooling circuit 5 flows through the valve device 17 and bypasses the ambient-air radiator 11. In other words, in the first switching state, on its way from the heat source Q3 to the chiller 14, the coolant flowing through the cooling circuit 5 does not flow through the ambient-air radiator 11 and is thus not cooled by way of the ambient-air radiator 11. Instead of the chiller 14, another heat exchanger, in particular another evaporator, could be provided.

If the valve device 17 is in the second switching state, the second cooling circuit 5 is fluidically connected to the flow branch 10 via the valve device 17, as a result of which at least a portion of the coolant flowing through the second cooling circuit 5, in particular all of the coolant flowing through the second cooling circuit 5, can be guided through the second ambient-air radiator 11 and is to be cooled by way of the second ambient-air radiator 11, thus is guided through the second ambient-air radiator 11 and is cooled by way of the second ambient-air radiator 11. If the valve device 17 is in the second switching state, since the valve device 17 is arranged in the cooling circuit 5 downstream of the heat source Q3 and upstream of the chiller 14, the coolant is branched off from the cooling circuit 5 on its way from the heat source Q3 to the chiller 14 and introduced into the flow branch 10 via the valve device 17, whereupon the coolant flows through the flow branch 10 and thus through the ambient-air radiator 11 and is cooled by way of the ambient-air radiator 11. Subsequently, the coolant flowing through the flow branch 10 is introduced back into the cooling circuit 5 via the valve device 17, whereupon the coolant cooled by way of the ambient-air radiator 11 can flow through the cooling circuit 5 and in particular through the chiller 14. The coolant flowing through the chiller 14 and thus through the cooling circuit 5 can be cooled by way of the chiller 14, in particular in addition to the ambient-air radiator 11, and therefore an effective and efficient cooling of the heat source Q3 can be implemented.

As in the first embodiment, the supply line 9 is also optional in the second embodiment, and therefore the supply line 9 can be omitted. Provision is optionally also made of an expansion tank 29, which is provided in particular if the supply line 9 is omitted. In particular, the expansion tank 26 may then be assigned to the second cooling circuit 5, in order for volume and/or quantity fluctuations of the coolant in the cooling circuit 5 to be compensated by way of the expansion tank 26. If, for example, the supply line 9 is provided, one of the expansion tanks 7 and 26 is for example sufficient in order for volume and/or quantity fluctuations of the coolant in the cooling circuits 2 and 5 to be able to be compensated by way of the one expansion tank 7 or 26. It is of course possible for the arrangement of the pumps 16 and 24 and the arrangement of the heat sources Q1, Q2 and Q3 and the arrangement of the ambient-air radiators 4 and 11 and of the chiller 14, which are heat sinks, to be varied. In the second embodiment, the ambient-air radiator 11 may also be switched to the cooling circuit 2 or to the cooling circuit 5 in a selective manner by way of the valve device 17, thus may be connected to the cooling circuit 2 or to the cooling circuit 5 in a selective manner, in order to thereby implement a particularly effective and efficient cooling in particular either of the heat source Q2 or of the heat source Q3 or of the heat sources Q1 and Q2 and of the heat source Q3 as required.

Figure 4:
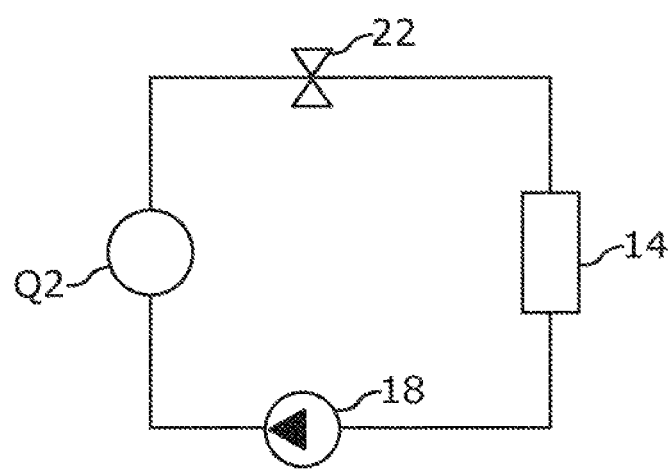
FIG. 4 shows a schematic illustration of an optional part of the cooling system according to the second embodiment.

FIG. 4 shows a schematic illustration of the refrigerant circuit 12, which may be part of the cooling system 1 according to the second embodiment shown in FIG. 3 and which is optionally provided. This means that the refrigerant circuit 12 may possibly be omitted. It is apparent that the heat source Q2 is arranged in the refrigerant circuit 12. The heat source Q2 in the refrigerant circuit 12 is arranged downstream of the refrigerant compressor 18 and upstream of the expansion valve 22 in the flow direction of the refrigerant flowing through the refrigerant circuit 12. In particular, the heat source Q2 may be a condenser for condensing the refrigerant or may function or operate as a condenser for condensing the refrigerant, in particular in such a way that the heat source Q2 can be used to exchange heat between the refrigerant flowing through the refrigerant circuit 12 and the coolant flowing through the cooling circuit 2, in particular through the branch S2, in particular in such a way that the heat source Q2 can be used to transfer heat from the refrigerant to the coolant flowing through the cooling circuit 2, in particular through the branch S2, and therefore through the heat source Q2. This makes it possible for the refrigerant to be cooled by way of the heat source Q2.

In the second embodiment shown in FIG. 3, in the second switching state, on its way from the heat source Q3 to the chiller 14, the coolant flowing through the cooling circuit 5 is branched off from the cooling circuit 5 via the valve device 17, introduced into the flow branch 10 and thus conducted through the ambient-air radiator 11 and cooled by way of the ambient-air radiator 11, whereupon the coolant flowing through the flow branch 10 is conducted back out of the flow branch 10 via the valve device 17 and introduced into the cooling circuit 5, whereupon the coolant cooled by way of the ambient-air radiator 11 can flow to and through the chiller 14. In the second switching state, on its way from the branching point A to the combining point Z, the coolant flowing through the cooling circuit 2 bypasses the flow branch 10 and the ambient-air radiator 11 and, on its way from the branching point A to the combining point Z and thus through the heat source Q2, is thus not cooled by way of the ambient-air radiator 11.

Figure 5:
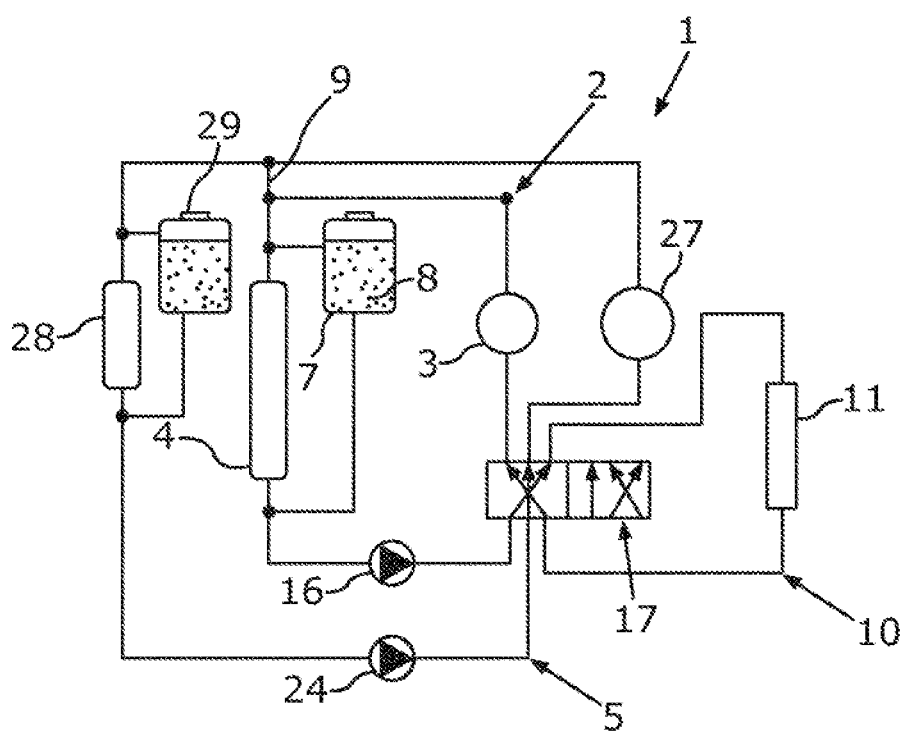
FIG. 5 shows a schematic illustration of a third embodiment of the cooling system.

Lastly, FIG. 5 shows a third embodiment of the cooling system 1. It is for example conceivable for the first embodiment and/or the second embodiment of the cooling system 1 to be used in an electric vehicle, in particular in a battery electric vehicle, thus in a hybrid vehicle or in a vehicle which can be driven in a purely electrical manner. In this case, it is in particular conceivable for the third embodiment of the cooling system shown in FIG. 5 to be used in a conventional vehicle which can thus be driven purely by combustion engine.

The motor vehicle which is for example equipped with the cooling system 1 according to the third embodiment comprises, for example, the aforementioned combustion engine as the drive machine 3 and can be driven by way of the combustion engine. The combustion engine comprises at least one or a plurality of combustion chambers, in which combustion processes take place during fired operation of the combustion engine. During the respective combustion process, a respective mixture is burned, said mixture comprising air, which is also referred to as combustion air, and an in particular liquid fuel. In order to implement particularly efficient operation of the combustion engine, the combustion air is compressed by way of at least one compressor, the compressed air also being referred to as charge air. The air can flow through an intake tract, also referred to as inlet tract, of the combustion engine and is conducted into the respective combustion chamber by way of the intake tract. Here, the aforementioned at least one compressor is arranged in the intake tract. Furthermore, a charge-air radiator 27 is arranged in the intake tract downstream of the compressor and can be flowed through by the compressed and, as a result, heated air. The compressed and, as a result, heated air can be cooled by way of the charge-air radiator 27, in particular before said air flows into the respective combustion chamber. It is apparent from FIG. 5 that the charge-air radiator 27 is arranged in the second cooling circuit 5, and therefore the charge-air radiator 27 can be flowed through by the preferably liquid coolant flowing through the cooling circuit 5 and by the charge air. The charge-air radiator 27 can be used to exchange heat between the charge air and the coolant flowing through the charge-air radiator 27, in particular such a way that heat from the compressed air can pass to the coolant flowing through the charge-air radiator 27, that is to say through the cooling circuit 5, by way of the charge-air radiator 27. In this way, the charge air is cooled by way of the charge-air radiator 27. It is thus apparent that, in the third embodiment, the charge-air radiator 27 is used instead of the energy store 6 or instead of the heat source Q3, or the charge-air radiator 27 is used as the heat source Q3 in the third embodiment.

In FIG. 5, the valve device 17 is in the first switching state, in which the first cooling circuit 2 is fluidically connected to the flow branch 10 via the valve device 17, as a result of which at least a portion of the coolant flowing through the first cooling circuit 2, in particular at least a predominant portion of the coolant flowing through the first cooling circuit 2, preferably all of the coolant flowing through the first cooling circuit, is guided through the second ambient-air radiator 11 and cooled by way of the second ambient-air radiator 11, in particular before the coolant flows through the drive machine 3 (combustion engine). In the first switching state, the coolant flowing through the cooling circuit 5 bypasses the ambient-air radiator 11 and is thus not cooled by way of the ambient-air radiator 11.

In the second switching state, on its way from the ambient-air radiator 4 to the drive machine 3, the coolant flowing through the cooling circuit 2 flows through the valve device 17, but in so doing bypasses the flow branch 10 and thus the ambient-air radiator 11, and therefore, in the second switching state, on its way from the ambient-air radiator 4 to the drive machine 3, the coolant flowing through the cooling circuit 2 is not cooled by way of the ambient-air radiator 11. In the second switching state, the coolant flowing through the cooling circuit 5 is branched off from the cooling circuit 5 by way of the valve device 17 and introduced into the flow branch 10, and therefore the coolant flowing through the cooling circuit 5 flows through the flow branch 10 and is thus cooled by way of the ambient-air radiator 11, whereupon the coolant which is cooled by way of the ambient-air radiator 11 and which flows through the flow branch 10 flows through the charge-air radiator 27 and thus cools the charge air by way of the charge-air radiator 27.

In the third embodiment, a third radiator 28 is arranged in the cooling circuit 5, in this case downstream of the charge-air radiator 27 and upstream of the valve device 17, said third radiator being provided in particular in addition to the ambient-air radiators 4 and 11 and being arranged outside of the ambient-air radiators 4 and 11. The third radiator 28 is preferably a third ambient-air radiator which, during the aforementioned travel, in particular forward travel, can be flowed around by ambient air and thus by air. The radiator 28 can be flowed through by the coolant flowing through the cooling circuit 5, and therefore the coolant flowing through the cooling circuit 5 can be cooled by way of the third radiator 28 by way of the air flowing around the radiator 28.

As also in the second embodiment, the supply line 9 is also optional in the third embodiment, and therefore the supply line 9 can be omitted. The expansion tank 26, which is shown in FIG. 5, is for example also optional.

Overall, it is apparent that in the first embodiment, the second embodiment and the third embodiment the valve device 17 can be switched between the first switching state and the second switching state. In the first switching state, the first cooling circuit 2 is fluidically connected to the flow branch 10 via the valve device 17, as a result of which at least a portion of the coolant flowing through the first cooling circuit 2 can be guided through the second ambient-air radiator 11 and is to be cooled by way of the second ambient-air radiator 11. In the second switching state, the second cooling circuit 5 is fluidically connected to the flow branch 10 via the valve device 17, as a result of which at least a portion of the coolant flowing through the second cooling circuit 5 can be guided through the second ambient-air radiator 11 and is to be cooled by way of the second ambient-air radiator 11. In the first embodiment, in the first switching state shown in FIG. 1, the flow branch 10 is fluidically connected to the flow path 15 via the valve device 17 and to the first cooling circuit 2 via the flow path 15, as a result of which at least the aforementioned portion of the coolant flowing through the first cooling circuit 2 can be guided via the flow path 15 through the second ambient-air radiator 11 and is to be cooled by way of the second ambient-air radiator 11.

LIST OF REFERENCE DESIGNATIONS

1 Cooling system
2 First cooling circuit
3 Drive machine
4 First ambient-air radiator
5 Second cooling circuit
6 Electrical energy store
7 Expansion tank
8 Quantity
9 Supply line
10 Flow branch
11 Second ambient-air radiator
12 Refrigerant circuit
13 Condenser
14 Chiller
15 Flow path
16 Pump
17 Valve device
18 Refrigerant compressor
19 Condenser
20 Evaporator
21 Expansion valve
22 Expansion valve
23 Internal heat exchanger
24 Pump
25 Fan
26 Spring device
27 Charge-air radiator
28 Radiator
29 Expansion tank
A Branching point
Q1 Heat source
Q2 Heat source
Q3 Heat source
S1 Branch
S2 Branch
V1 First connecting point
V2 Second connecting point
Z Combining point

What is claimed is:

1. A cooling system for a motor vehicle, comprising:
a first cooling circuit through which a coolant can flow,
at least one drive machine to drive the motor vehicle, the at least one drive machine arranged in the first cooling circuit so as to be cooled by the coolant,
a first radiator arranged in the first cooling circuit for cooling the coolant flowing through the first cooling circuit,
a second cooling circuit through which the coolant can flow,
a flow branch through which the coolant can flow,
a second radiator arranged in the flow branch for cooling the coolant flowing through the flow branch, and
a valve device which can be switched between a first switching state and a second switching state,
wherein in the first switching state, the first cooling circuit is fluidically connected to the flow branch via the valve device, such that at least a portion of the coolant flowing through the first cooling circuit can be guided through the second radiator to be cooled by the second radiator, wherein the first radiator and the second radiator are connected in series in a flow direction of the coolant flowing through the first cooling circuit and the flow branch, and
wherein in the second switching state, the second cooling circuit is fluidically connected to the flow branch via the valve device, such that at least a portion of the coolant flowing through the second cooling circuit can be guided through the second radiator to be cooled by the second radiator.

2. The cooling system according to claim 1,
wherein the first radiator is a first ambient-air radiator which can be flowed around by air, such that the coolant flowing through the first cooling circuit is cooled, and
wherein the second radiator is a second ambient-air radiator which can be flowed around by air, such that the coolant flowing through the second cooling circuit is cooled.

3. The cooling system according to claim 1,
comprising at least one heat exchanger fluidically connected to one of the cooling circuits and through which the portion or a further portion of the coolant flowing through the one cooling circuit can flow, said heat exchanger provided in addition to the radiators and arranged in a fluid circuit through which a further fluid can flow, as a result of which the heat exchanger can be used to exchange heat between the further fluid and the coolant flowing through the heat exchanger.

4. The cooling system according to claim 3,
wherein the at least one heat exchanger is a cooling element to transfer heat from the further fluid to the coolant flowing through the at least one heat exchanger for the purpose of cooling the further fluid.

5. The cooling system according to claim 3,
comprising a second heat exchanger arranged in the other cooling circuit and in the fluid circuit through which the further fluid can flow, such that both the coolant flowing through the other cooling circuit and the further fluid can flow through the second heat exchanger, said second heat exchanger provided in addition to the at least one heat exchanger, and being able to be used to transfer heat between the coolant flowing through the second heat exchanger and the further fluid.

6. The cooling system according to claim 5,
wherein the second heat exchanger is a cooling device used to transfer heat from the coolant flowing through the second heat exchanger to the further fluid for the purpose of cooling the coolant flowing through the second heat exchanger.

7. The cooling system according to claim 3, wherein the fluid circuit is a refrigerant circuit of an air-conditioning device operable as a compression refrigeration machine, and the refrigerant circuit of which can be flowed through by the further fluid as refrigerant.

8. The cooling system according to claim 7, wherein the at least one heat exchanger is a condenser for condensing the refrigerant.

9. The cooling system according to claim 3, comprising a flow path which is fluidically connected at i) a first connecting point arranged downstream of the first radiator and upstream of the drive machine in a flow direction of the coolant flowing through the first cooling circuit, and ii) at a second connecting point which is arranged downstream of the drive machine and upstream of the first radiator in the flow direction of the coolant flowing through the first cooling circuit, to the first cooling circuit, which is the one cooling circuit, and through which at least the portion of the coolant flowing through the first cooling circuit can flow,
wherein the at least one heat exchanger is arranged both in the flow path and in the fluid circuit through which the further fluid can flow, and can be flowed through both by the coolant flowing through the flow path and by the further fluid as a result, and wherein, in the first switching state, the flow branch is fluidically connected to the flow path via the valve device and to the first cooling circuit via the flow path, as a result of which at least the portion of the coolant flowing through the first cooling circuit can be guided via the flow path through the second radiator to be cooled by the second radiator.

10. The cooling system according to claim 1, comprising at least one heat source arranged in the second cooling circuit and provided in addition to the drive machine, which is to be cooled by the coolant flowing through the second cooling circuit.

11. The cooling system according to claim 10, wherein the at least one heat source is an electrical energy store for storing electrical energy.

12. The cooling system according to claim 10, wherein the at least one heat source is a charge-air radiator for cooling air compressed by at least one compressor and fed to at least one combustion chamber of a combustion engine of the motor vehicle.

13. The cooling system according to claim 1, wherein the valve device can be switched electrically from at least one of the switching states to the other switching state.

14. The cooling system according to claim 1, comprising a spring device to switch the valve device from the other switching state to the one switching state.

15. A motor vehicle having a cooling system according to claim 1.

* * * * *